June 2, 1936.  W. H. CHARCH ET AL  2,042,589
MOISTUREPROOF MATERIAL AND METHOD OF MAKING THE SAME
Filed Feb. 6, 1934
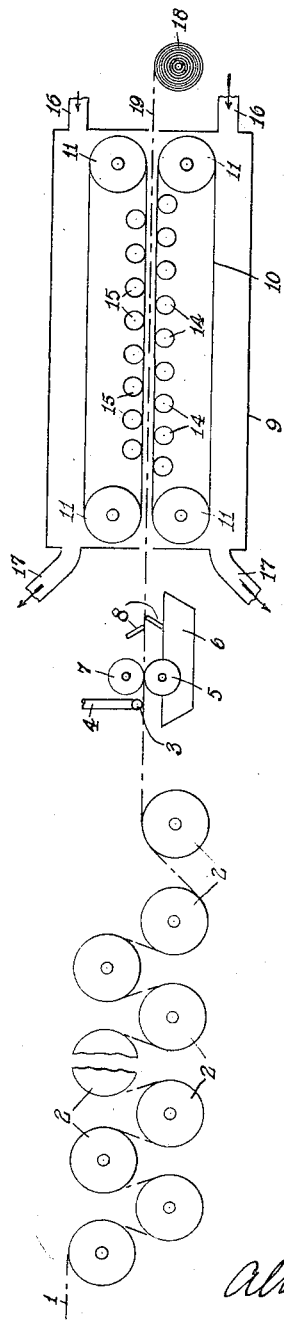
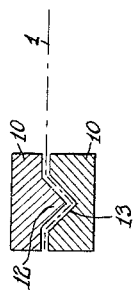
William Hale Charch and
Albert Hershberger INVENTORS
Wm. S. Pritchard
ATTORNEY Patented June 2, 1936

2,042,589

UNITED STATES PATENT OFFICE 2,042,589

MOISTUREPROOF MATERIAL AND METHOD OF MAKING THE SAME

William Hale Charch, Buffalo, and Albert Hershberger, Kenmore, N. Y., assignors to Du Pont Cellophane Company, Inc., New York, N. Y., a corporation of Delaware Application February 6, 1934, Serial No. 709,924

20 Claims. (Cl. 91—70)

This invention relates to a transparent moistureproof material admirably suited for use as a wrapping tissue and to the method of making the same.

Prior to this invention, when a lacquer was applied to any base, precautions were taken not only to exclude moisture and/or water from the surface to which the lacquer was applied but also to exclude water from the lacquer itself. In these procedures, during the drying of the lacquer considerable care was also taken to prevent atmospheric moisture from condensing on the lacquer film. Indeed, precautions were taken to prevent water from any external sources from entering in contact with the lacquer coating prior to the evaporation of all of the solvents. If precautions such as have just been mentioned were not taken, serious and deleterious effects would be caused in the final coating. For instance, if a partly dried film of lacquer became spotted by or wetted with water, the final dry film would be spotted, blushed, sticky or otherwise marred where the water contacted therewith. If the material to which the lacquer coating was applied were wet or certain areas thereof were wet, in addition to the aforementioned serious disadvantages the coating would not tenaciously adhere to the wet areas.

Sheets or films of regenerated cellulose have been moistureproofed by the application of a moistureproofing lacquer, such as cellulose derivative lacquers, containing a wax, with or without a gum or resin, and with or without a plasticizer. In the process employed, the moistureproofing lacquer was applied to a preformed dry sheet or film of regenerated cellulose. The same precautionary measures mentioned above were also taken in this process.

In one of the embodiments of moistureproofing sheets or films of regenerated cellulose, the latter was subjected to a humidifying treatment to slightly increase the moisture content thereof prior to the application of the moistureproofing lacquer. When this modification was employed, extreme care was taken to prevent condensed moisture from dropping on the film and spotting it. If moisture drops were present on the film and the lacquer applied thereto, spotting would result and there would be obtained the highly undesirable results previously mentioned.

As is apparent from the foregoing, due to the precautions which had to be taken, it was necessary to first produce regenerated cellulose sheeting which was dry to the touch, and, subsequently, in operations separate and distinct from the process of making the regenerated cellulose sheeting, apply the moistureproofing lacquer. So far as the prior art is concerned, it was deemed impossible to apply a moistureproofing lacquer in the presence of water to a sheet or film of regenerated cellulose and secure a glass-clear transparent, unmarred film.

Much to our surprise and amazement, and contrary to the teachings of the prior art, we have found that we can coat a sheet or film of regenerated cellulose containing from 50% to 300% more or less of moisture based on the weight of the dry cellulose with a moistureproofing lacquer.

We have found that by coating wet gel regenerated cellulose sheeting with a moistureproofing lacquer containing organic solvents and subjecting the coated regenerated cellulose sheeting to a temperature sufficiently high to simultaneously drive off the water and evaporate the solvent of the lacquer we can produce an unmarred, glass-clear transparent, moistureproof, non-tacky, glossy, flexible, and substantially odorless product.

The advantages of such a process are self-evident. It permits a simplified process of manufacturing moistureproofed sheets or films of regenerated cellulose in an operation continuous with the process of making the said sheet or film of regenerated cellulose.

Still further, the coating of the product prepared in accordance with the instant invention possesses a more improved adhesion to the base than that present in the material made by the prior art procedures.

It is, therefore, an object of this invention to provide a simple, continuous method of making moistureproofed sheets or films of cellulosic materials.

Another object of this invention is to provide a method which comprises coating regenerated cellulose sheets or films with a moistureproofing lacquer in the presence of water and simultaneously evaporating the water and the solvents of the lacquer in a single operation.

Other objects of this invention will become apparent from the following description, appended claims and accompanying drawing forming a part of this specification and wherein:

Figure 1 is a diagrammatic side elevation of an apparatus for carrying out the process constituting one phase of this invention.

Figure 2 is a cross-section of one embodiment of the means which may be used for conducting the coated material through a drier.

In accordance with one of the usual processes for the manufacture of a regenerated cellulose film, a viscose solution of appropriate cellulose, alkali content and salt index is cast into a coagulating bath. The coagulated film is then subjected to a regenerating bath, whereby the cellulose xanthate is converted into cellulose. In certain embodiments of the process, the coagulation and regeneration operations may be carried out in a single step. The regenerated cellulose film is then subjected to the usual purifying operations, i. e., desulphuring and bleaching. If glycerin is to be incorporated in the regenerated cellulose film, the purified regenerated cellulose film is passed through a bath containing the glycerin.

In accordance with the principles of this invention, upon the exit from the glycerinating bath the glycerin-impregnated sheet or film of regenerated cellulose is preferably passed over one or two heated rollers in order to remove any surface water which may have been left upon the sheet. By "surface water" is meant water in such an amount as may be blotted or squeezed off. It is to be noted that this passage of the film over the heated rollers merely removes water en masse from the surface and evaporates the water from the interior of the gel sheet only to a very small extent. In other words, the regenerated cellulose film is still definitely in the gel form and contains 300% more or less of moisture.

Alternatively, the gel sheet may be passed over a number of drying rollers to drive off not only the surface moisture but also a portion of the internal moisture, so that the film contains less than 300%, such as, for example, from 50% to 150% moisture based on the weight of the dry cellulose.

The moistureproofing lacquer hereinafter more fully explained is then applied in any convenient manner to the film. After applying the lacquer, the coated sheet is dried in such a manner that its surface does not contact any mechanical elements until the coating has become free from the solvents.

In the drying operation, the sheet or film is preferably dried flat and supported at the zones adjacent the edges thereof under such conditions as will permit and allow for the natural shrinkage of the sheet while it is drying. The air in the drier is maintained above the melting point of the wax or waxy constituents used in the coating composition. Thus, this drying serves to simultaneously eliminate the moisture from the base sheet or film of regenerated cellulose and to evaporate the solvents from the coating. The temperature of the drier is preferably above 60° C. but usually not over 100° C.

In the preferred type of drier, air, preferably heated to the appropriate temperature, is introduced in the drier in such a manner as to contact both sides of the sheet and preferably travel in a direction opposite to the direction of travel of the sheet. If desired, auxiliary heating units, for example, steam pipes, may be positioned at suitable places in the interior of the drier. The air from the drier is led off in any suitable manner to a solvent recovery plant whereby the solvents from the lacquer are recovered for reuse. The length of the drier and/or the rate at which the coated sheet is conducted therethrough is such that, upon exit from the drier, the solvent has been evaporated and the coating set.

The simultaneous elimination of the water and solvents from the sheet has the effect of producing a less odorous product in a short period of operation. With certain solvents or under certain conditions, the final product may not require an after humidification treatment. Where an after humidification treatment is desirable, it may be employed.

When an after humidifying treatment is employed, it is advantageous to have a separate humidifying chamber or a separate humidifying treatment given to the film prior to winding it at the end of the operation.

If locking belts are employed to grip the film at its beaded edges and convey the same through the drier, then after leaving the drier the edges of the film will be moist or possibly wet because being held by the belts they will not have had the opportunity to be dried. The wet marginal portions of the film must be removed before the film is wound up. Otherwise the moisture in the marginal portions will affect the dryness of the wound film. Also, the beads due to their swollen condition would make the roll extra thick at the ends. Hence, prior to winding the product on the roller, the bead of the film and also that portion where it has been held by the gripping mechanism is slit, in any suitable manner, and removed.

The moistureproofing lacquers used in this process preferably contain substantial quantities of intermediate boiling solvents, such as amyl acetate, butyl acetate, butyl butyrate, etc. alone or in conjunction with hydrocarbon or chlorinated hydrocarbon diluents. The moistureproofing lacquers may also contain emulsified water.

In order to more fully explain the invention, there is hereinafter set forth illustrative embodiments of moistureproofing lacquers which have given satisfactory results:

Example I

| | Parts |
|---|---|
| 7.1" pyroxylin | 10.0 |
| Gum dammar (dewaxed) | 1.5 |
| Dibutyl phthalate | 7.5 |
| Paraffin (melting point 60°–62° C.) | 0.5 |
| Amyl acetate | 200.0 |

Example II

| | Parts |
|---|---|
| Methyl methacrylate resin | 10.0 |
| Paraffin (melting point 60°–62° C.) | 1.0 |
| Gum dammar (dewaxed) | 3.0 |
| Toluene | 200.0 |

Example III

| | Parts |
|---|---|
| Ethyl cellulose | 8.0 |
| Rosin or ester gum | 8.0 |
| Paraffin (melting point 60°–62° C.) | 0.5 |
| Toluene | 185.0 |
| n-Propyl alcohol | 6.0 |

Example IV

| | Parts |
|---|---|
| ½" pyroxylin | 9.5 |
| Gum dammar (dewaxed) | 1.5 |
| Tricresyl phosphate | 5.0 |
| Paraffin | 0.5 |
| Toluene | 95.0 |
| Ethyl acetate | 95.0 |
| n-Propyl alcohol | 12.5 |

As previously stated we may use moistureproofing lacquer containing emulsified water. Such a lacquer is made up as follows:

(A) Preparation of emulsifying agents

Dissolve 5 parts sodium oleate soap in 150 parts toluene and heat to give a clear gel. To this gel (or solution) are now added with vigorous stirring 20 parts of water.

(B) Preparation of lacquer

To 200 parts (approximately) of any of the lacquers described above are added 60 parts of the emulsion described in (A) above and thoroughly mixed. Then, while the mass is vigorously stirred, there is added dropwise in a slow stream 70 parts of water to produce a stable uniform dispersion of water in the lacquer. The lacquer is now ready to be used for coating as herein described.

Referring now to the drawing wherein like reference numerals designate like parts, the reference numeral 1 designates a purified (desulphured and bleached) glycerinated gel sheet or film of regenerated cellulose produced in a manner well known in the art. The gel film 1 passes through a bank of heated drier rollers 2, the number of drying rollers depending upon whether or not only the surface moisture of the gel film is to be removed or whether the moisture content in the gel film is to be reduced to less than 300%, for example, 50% to 150%, based on the dry cellulose. The film 1 is then conducted to a suitable lacquer-applying mechanism where a lacquer coating of predetermined thickness is applied.

In the form illustrated in Figure 1 of the drawing, lacquer is applied to the upper surface of the film by means of a slotted or perforated conduit 3 connected by means of a pipe 4 to a suitable source of supply (not shown). A predetermined quantity of lacquer is applied to the under surface of the film by means of a roller 5 rotatably mounted in a tank 6 containing the lacquer. If desired, a doctor knife (not shown) may be used in conjunction with the roller 5 to control the amount of lacquer applied to the film from the under side. A roller 7 is disposed in advance of the lacquer-applying mechanism 3 and in superposed relationship to the roller 5. By this arrangement, the rollers 5 and 7 also serve as squeeze rollers to remove the excess quantity of the lacquer applied to the film. The roller 7 is adjustably mounted in any suitable manner so that the desired result may be attained. It is to be understood that the invention is not restricted to the precise manner of applying the lacquer hereinbefore described. Any suitable manner of applying the lacquer, such as immersion, may be used.

After the application of the lacquer, the coated film passes between a pair of oppositely disposed smoothing knives 8 which are preferably arranged in the manner illustrated in the drawing, whereby the coating is smoothed. If desired, the coating and smoothing mechanisms may be enclosed.

The coated film then passes into a drier 9 disposed adjacent the lacquer-applying mechanism and wherein the moisture in the base film of regenerated cellulose and the lacquer solvents are simultaneously driven off. The coated film is caused to travel through the drier in such a manner that the coating on the film does not contact with any mechanical elements except at the marginal edges where it is gripped by the conveying mechanism. The gripping of the coated film at the edges maintains it flat and free from wrinkles during the drying.

In the form illustrated, a pair of endless interlocking belts 10 are mounted adjacent the edges of the film and grip the film to hold it in an expanded transverse direction. The belts 10 are trained across pulleys 11 driven in a manner well known in the art, and so arranged that they do not run parallel to each other but are disposed at a slightly converging angle so as to allow for the natural shrinkage of the sheet while it is drying. Shrinkage of between 2% and 10% is usually allowed during this drying operation. It is, of course, to be understood that this shrinkage depends upon the type of sheet, the rate of removal of the moisture and the amount remaining in the sheet to be removed after the coating is applied.

The locking belts may be of the type illustrated in Figure 2. Referring now to Figure 2, it will be noted that the upper belt 10 is provided with a projecting member 12 which cooperates with a complementary shaped depression 13 in the lower belt 10, whereby the marginal portion of the film is gripped. If desired, the surfaces of the elements 12 and 13 may be provided with a tractive surface, whereby a firmer grip is provided. The belts 10 are maintained in interlocked position by means of rollers 14 and 15 which are preferably mounted in staggered relationship with each other; (see Figure 1). The rollers 14 and 15 are disposed so as to maintain the belts 10 in interlocked relationship after the film has been gripped by said belts. The rollers 14 and 15 are also designed to permit unlocking of the belts immediately prior to the exit of the film from the drier whereby the dried coated film may pass from the drier. The drier is of such length and/or the belts are driven at such speeds that the film, upon leaving the same, will be in the dried condition.

It is perfectly obvious that, instead of using interlocking belts of the type just mentioned, self-clamping belts or clamping devices similar to the well-known tenter frames may be used.

The drying of the coated film is secured by introducing air, preferably at an elevated tempertature, into the drier and causing the same to pass in a direction opposite to the path of travel of the film in the drier. With this in view, one or more air inlets 16 are provided at the exit side of the drier and one or more air outlets 17 are provided at the entrance side of the drier. The air outlets 17 are connected to a solvent recovery mechanism (not shown). Any number of inlets and outlets to secure proper circulation and complete removal of both water and solvent before the film reaches the end of the drier may be used. In the form shown in the drawing, two air inlets 16 arranged adjacent the top and bottom of the drier are provided and a like number of air outlets 17 is disposed in similar positions.

If desired, heating elements (not shown) may be disposed at convenient locations within the drier.

Upon exit from the drier, the coated film is wound up on a suitable wind-up roller 18. Preferably, between the exit of the film from the drier 9 and the wind-up mechanism 18, a slitter is positioned at the place indicated by the reference numeral 19 to cut the beaded edge and the marginal portions gripped by the mechanism in the drier.

The product produced by the method hereinbefore described is glass-clear in transparency, glossy, flexible non-tacky, and substantially odorless, as well as moistureproof. The total coating on both sides of the ultimate product is from 0.00005 to 0.00025 inches and preferably 0.00015 inches in thickness. It adheres to the base film very tenaciously and indeed to a greater degree than that present when moistureproof sheets or films of regenerated cellulose made by the prior art methods are used.

Though the invention for convenience is specifically described in connection with regenerated cellulose sheeting produced from viscose, the invention is not restricted thereto. It is equally applicable to any transparent cellulosic base which is obtained in the gel form by precipitation or coagulation of aqueous solutions or dispersions of cellulosic substances, such as cuprammonium cellulose, glycol cellulose, lowly etherified celluloses, etc.

Though the invention has been specifically described in connection with gel pellicles, it is to be understood that a previously prepared dried pellicular base may be thoroughly wetted with water and treated in accordance with the principles of this invention. Thus, for example, a film of regenerated cellulose sheeting may be unwound from a completed roll thereof and passed through a bath of water and glycerin, whereby sufficient water is introduced into the film so that the latter contains approximately 300% moisture based on the dry cellulose. This wetted film may then be treated as hereinbefore described.

In this specification the term "gel" is defined as covering a cellulosic base of the type herein described which has never been dried.

For the purposes of this specification and claims, we define moistureproof materials as those which, in the form of continuous, unbroken sheets or films, permit the passage of not more than 690 grams of water vapor per 100 square meters per hour, over a period of 24 hours, at approximately 39.5° C. ± 0.5° C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which, when laid down in the form of a thin, continuous, unbroken film applied uniformly as a coating with a total coating thickness not exceeding 0.0005" to both sides of a sheet of regenerated cellulose of thickness approximately 0.0009", will produce a coated product which is moistureproof.

For the purposes of experimental tests, especially for those materials adaptable as coating compositions, moistureproof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C. ± 0.5° C. (preferably 39.5° C. ± 0.25° C.), with a water vapor pressure differential of 50–55 mm. (preferably 53.4 ± 0.7 mm.) of mercury. For convenience, the number of grams of water vapor passed under these conditions may be referred to as "the permeability value". An uncoated sheet of regenerated cellulose having a thickness of approximately 0.0009" will show a permeability value of the order of 6,900.

From the foregoing, it is apparent that under the conditions set forth, a moistureproofed regenerated cellulose sheet is capable of resisting the passage of moisture or water vapor therethrough at least ten times as effectively as the uncoated regenerated cellulose sheet.

Since it is obvious that various changes and modifications may be made in the above description without departing from the nature or spirit thereof, this invention is not restricted thereto except as set forth in the appended claims.

We claim:

1. A method of preparing a transparent moistureproof material which comprises coating a pellicle of a cellulosic material obtained by precipitation or coagulation of aqueous cellulosic solutions or dispersions and containing approximately 50% to 300% of moisture, based on the dry mass constituting the pellicle, with a moistureproofing composition containing, in addition to the film-forming ingredients, a waxy substance and organic solvents, and simultaneously drying out the moisture from the pellicle and evaporating the solvents from the coating at an elevated temperature which at some stage of the operation is at least equal to the melting point of the waxy substance in the composition.

2. A method of preparing a transparent moistureproof material which comprises coating a pellicle of a cellulosic material obtained by precipitation or coagulation of aqueous cellulosic solutions or dispersions and containing approximately 50% to 300% of moisture, based on the dry mass constituting the pellicle, with a moistureproofing composition containing, in addition to the film-forming ingredients, a waxy substance and organic solvents, and under conditions permitting the pellicle to shrink laterally thereof; simultaneously drying out the moisture from the pellicle and evaporating the solvents from the coating at an elevated temperature which at some stage of the operation is at least equal to the melting point of the waxy substance in the composition.

3. A continuous method of preparing a transparent moistureproof material which comprises producing a pellicle of a cellulosic material by precipitation or coagulation of aqueous cellulosic solutions or dispersions in the gel state, removing the surface moisture, coating the thus treated pellicle while still in the gel state with a moistureproofing composition containing, in addition to the film-forming ingredients, a waxy substance and organic solvents, and simultaneously drying out the moisture from the pellicle and evaporating the solvents from the coating at an elevated temperature which at some stage of the operation is at least equal to the melting point of the waxy substance in the composition.

4. A continuous method of preparing a transparent moistureproof material which comprises producing a pellicle of a cellulosic material by precipitation or coagulation of aqueous cellulosic solutions or dispersions in the gel state, removing the surface moisture, reducing the moisture content of the pellicle so that it contains not less than 50% by weight based on the dry pellicle, coating the thus treated pellicle with a moistureproofing composition containing, in addition to the film-forming ingredients, a waxy substance and organic solvents, and simultaneously drying out the moisture from the pellicle and evaporating the solvents from the coating at an elevated temperature which at some stage of the operation is at least equal to the melting point of the waxy substance in the composition.

5. A continuous method of preparing a transparent moistureproof material which comprises producing a pellicle of a cellulosic material by precipitation or coagulation of aqueous cellulosic solutions or dispersions in the gel state, removing the surface moisture, coating the thus treated pellicle while still in the gel state with a moistureproofing composition containing, in addition to the film-forming ingredients, a waxy substance and organic solvents, and under conditions permitting the pellicle to shrink laterally thereof, simultaneously drying out the moisture from the pellicle and evaporating the solvents from the coating at an elevated temperature which at some stage of the operation is at least equal to the melting point of the waxy substance in the composition.

6. A continuous method of preparing a transparent moistureproof material which comprises producing a pellicle of a cellulosic material by precipitation or coagulation of aqueous cellulosic solutions or dispersions in the gel state, removing the surface moisture, reducing the moisture content of the pellicle so that it contains not less than 50% by weight based on the dry pellicle, coating the thus treated pellicle with a moistureproofing composition containing, in addition to the film-forming ingredients, a waxy substance and organic solvents, and under conditions permitting the pellicle to shrink laterally thereof, simultaneously drying out the moisture from the pellicle and evaporating the solvents from the coating at an elevated temperature which at some stage of the operation is at least equal to the melting point of the waxy substance in the composition.

7. A continuous method of preparing transparent moistureproof materials which comprises producing a pellicle in the gel state and having beads on the longitudinal edges thereof by precipitation or coagulation of aqueous cellulosic solutions or dispersions, removing the surface moisture, coating the thus treated pellicle while still in the gel state with a moistureproofing composition containing, in addition to the film-forming ingredients, a waxy substance and organic solvents, gripping the coated pellicle at zones adjacent the beads, conducting the coated pellicle through an atmosphere maintained at elevated temperature to simultaneously dry out the moisture and evaporate the solvents from the coating, the temperature at some stage of the drying operation being at least equal to the melting point of the waxy substance in the composition, releasing the grip on the pellicle, cutting away the beads and portion of the pellicle previously gripped from the pellicle, and finally winding up the pellicle.

8. A continuous method of preparing transparent moistureproof materials which comprises producing a pellicle in the gel state and having beads on the longitudinal edges thereof by precipitation or coagulation of aqueous cellulosic solutions or dispersions, removing the surface moisture, reducing the moisture content of the pellicle so that it contains not less than 50% by weight based on the dry pellicle, coating the thus treated pellicle with a moistureproofing composition containing, in addition to the film-forming ingredients, a waxy substance and organic solvents, gripping the coated pellicle at zones adjacent the beads, conducting the coated pellicle through an atmosphere maintained at elevated temperature to simultaneously dry out the moisture and evaporate the solvents from the coating, the temperature at some stage of the drying operation being at least equal to the melting point of the waxy substance in the composition, releasing the grip on the pellicle, cutting away the beads and portion of the pellicle previously gripped from the pellicle, and finally winding up the pellicle.

9. A continuous method of preparing transparent moistureproof materials which comprises producing a pellicle in the gel state and having beads on the longitudinal edges thereof by precipitation or coagulation of aqueous cellulosic solutions or dispersions, removing the surface moisture, coating the thus treated pellicle while still in the gel state with a moistureproofing composition containing, in addition to the film-forming ingredients, a waxy substance and organic solvents, gripping the coated pellicle at zones adjacent the beads, conducting the coated pellicle through an atmosphere maintained at elevated temperature under conditions permitting the pellicle to shrink laterally to simultaneously dry out the moisture and evaporate the solvents from the coating, the temperature at some stage of the drying operation being at least equal to the melting point of the waxy substance in the composition, releasing the grip on the pellicle, cutting away the beads and portion of the pellicle previously gripped from the pellicle, and finally winding up the pellicle.

10. A continuous method of preparing transparent moistureproof materials which comprises producing a pellicle in the gel state and having beads on the longitudinal edges thereof by precipitation or coagulation of aqueous cellulosic solutions or dispersions, removing the surface moisture, reducing the moisture content of the pellicle so that it contains not less than 50% by weight based on the dry pellicle, coating the thus treated pellicle with a moistureproofing composition containing, in addition to the film-forming ingredients, a waxy substance and organic solvents, gripping the coated pellicle at zones adjacent the beads, conducting the coated pellicle through an atmosphere maintained at elevated temperature under conditions permitting the pellicle to shrink laterally to simultaneously dry out the moisture and evaporate the solvents from the coating, the temperature at some stage of the drying operation being at least equal to the melting point of the waxy substance in the composition, releasing the grip on the pellicle, cutting away the beads and portion of the pellicle previously gripped from the pellicle, and finally winding up the pellicle.

11. A method of preparing a transparent moistureproof material which comprises coating a pellicle of regenerated cellulose and containing approximately 50% to 300% of moisture, based on the dry mass constituting the pellicle, with a moistureproofing composition containing, in addition to the film-forming ingredients, a waxy substance and organic solvents, and simultaneously drying out the moisture from the pellicle and evaporating the solvents from the coating at an elevated temperature which at some stage of the operation is at least equal to the melting point of the waxy substance in the composition.

12. A method of preparing a transparent moistureproof material which comprises coating a pellicle of regenerated cellulose and containing approximately 50% to 300% of moisture, based on the dry mass constituting the pellicle, with a moistureproofing composition containing, in addition to the film-forming ingredients, a waxy substance and organic solvents, and under conditions permitting the pellicle to shrink laterally thereof, simultaneously drying out the moisture from the pellicle and evaporating the solvents from the coating at an elevated temperature which at some stage of the operation is at least equal to the melting point of the waxy substance in the composition.

13. A continuous method of preparing a transparent moistureproof material which comprises producing a pellicle of regenerated cellulose in the gel state, removing the surface moisture, coating the thus treated pellicle while still in the gel state with a moistureproofing composition containing, in addition to the film-forming ingredients, a waxy substance and organic solvents, and simultaneously drying out the moisture from the pellicle and evaporating the solvents from the coating at an elevated temperature which at some stage of the operation is at least equal to the melting point of the waxy substance in the composition.

14. A continuous method of preparing a transparent moistureproof material which comprises producing a pellicle of regenerated cellulose in the gel state, removing the surface moisture, reducing the moisture content of the pellicle so that it contains not less than 50% by weight based on the dry pellicle, coating the thus treated pellicle with a moistureproofing composition containing, in addition to the film-forming ingredients, a waxy substance and organic solvents, and simultaneously drying out the moisture from the pellicle and evaporating the solvents from the coating at an elevated temperature which at some stage of the operation is at least equal to the melting point of the waxy substance in the composition.

15. A continuous method of preparing a transparent moistureproof material which comprises producing a pellicle of regenerated cellulose in the gel state, removing the surface moisture, coating the thus treated pellicle while still in the gel state with a moistureproofing composition containing, in addition to the film-forming ingredients, a waxy substance and organic solvents, and under conditions permitting the pellicle to shrink laterally thereof, simultaneously drying out the moisture from the pellicle and evaporating the solvents from the coating at an elevated temperature which at some stage of the operation is at least equal to the melting point of the waxy substance in the composition.

16. A continuous method of preparing a transparent moistureproof material which comprises producing a pellicle of regenerated cellulose in the gel state, removing the surface moisture, reducing the moisture content of the pellicle so that it contains not less than 50% by weight based on the dry pellicle, coating the thus treated pellicle with a moistureproofing composition containing, in addition to the film-forming ingredients, a waxy substance and organic solvents, and under conditions permitting the pellicle to shrink laterally thereof, simultaneously drying out the moisture from the pellicle and evaporating the solvents from the coating at an elevated temperature which at some stage of the operation is at least equal to the melting point of the waxy substance in the composition.

17. A continuous method of preparing transparent moistureproof materials which comprises producing a regenerated cellulose pellicle in the gel state and having beads on the longitudinal edges thereof, removing the surface moisture, coating the thus treated pellicle while still in the gel state with a moistureproofing composition containing, in addition to the film-forming ingredients, a waxy substance and organic solvents, gripping the coated pellicle at zones adjacent the beads, conducting the coated pellicle through an atmosphere maintained at elevated temperature to simultaneously dry out the moisture and evaporate the solvents from the coating, the temperature at some stage of the drying operation being at least equal to the melting point of the waxy substance in the composition, releasing the grip on the pellicle, cutting away the beads and portion of the pellicle previously gripped from the pellicle, and finally winding up the pellicle.

18. A continuous method of preparing transparent moistureproof materials which comprises producing a regenerated cellulose pellicle in the gel state and having beads on the longitudinal edges thereof, removing the surface moisture, reducing the moisture content of the pellicle so that it contains not less than 50% by weight based on the dry pellicle, coating the thus treated pellicle with a moistureproofing composition containing, in addition to the film-forming ingredients, a waxy substance and organic solvents, gripping the coated pellicle at zones adjacent the beads, conducting the coated pellicle through an atmosphere maintained at elevated temperature to simultaneously dry out the moisture and evaporate the solvents from the coating, the temperature at some stage of the drying operation being at least equal to the melting point of the waxy substance in the composition, releasing the grip on the pellicle, cutting away the beads and portion of the pellicle previously gripped from the pellicle, and finally winding up the pellicle.

19. A continuous method of preparing transparent moistureproof materials which comprises producing a regenerated cellulose pellicle in the gel state and having beads on the longitudinal edges thereof, removing the surface moisture, coating the thus treated pellicle while still in the gel state with a moistureproofing composition containing, in addition to the film-forming ingredients, a waxy substance and organic solvents, gripping the coated pellicle at zones adjacent the beads, conducting the coated pellicle through an atmosphere maintained at elevated temperature under conditions permitting the pellicle to shrink laterally to simultaneously dry out the moisture and evaporate the solvents from the coating, the temperature at some stage of the drying operation being at least equal to the melting point of the waxy substance in the composition, releasing the grip on the pellicle, cutting away the beads and portion of the pellicle previously gripped from the pellicle, and finally winding up the pellicle.

20. A continuous method of preparing transparent moistureproof materials which comprises producing a regenerated cellulose pellicle in the gel state and having beads on the longitudinal edges thereof, removing the surface moisture, reducing the moisture content of the pellicle so that it contains not less than 50% by weight based on the dry pellicle, coating the thus treated pellicle with a moistureproofing composition containing, in addition to the film-forming ingredients, a waxy substance and organic solvents, gripping the coated pellicle at zones adjacent the beads, conducting the coated pellicle through an atmosphere maintained at elevated temperature under conditions permitting the pellicle to shrink laterally to simultaneously dry out the moisture and evaporate the solvents from the coating, the temperature at some stage of the drying operating being at least equal to the melting point of the waxy substance in the composition, releasing the grip on the pellicle, cutting away the beads and portion of the pellicle previously gripped from the pellicle, and finally winding up the pellicle.

WILLIAM HALE CHARCH.
ALBERT HERSHBERGER.